(12) United States Patent
Bergman

(10) Patent No.: US 9,944,125 B2
(45) Date of Patent: Apr. 17, 2018

(54) INNER LINER FOR PNEUMATIC TIRE

(75) Inventor: Brian R Bergman, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 419 days.

(21) Appl. No.: 14/365,546

(22) PCT Filed: Dec. 22, 2011

(86) PCT No.: PCT/US2011/066764
§ 371 (c)(1),
(2), (4) Date: Jun. 13, 2014

(87) PCT Pub. No.: WO2013/095491
PCT Pub. Date: Jun. 27, 2013

(65) Prior Publication Data
US 2015/0000812 A1  Jan. 1, 2015

(51) Int. Cl.
*B60C 1/00* (2006.01)
*B60C 5/02* (2006.01)
*C08L 23/22* (2006.01)

(52) U.S. Cl.
CPC .............. *B60C 1/0008* (2013.01); *B60C 5/02* (2013.01); *C08L 23/22* (2013.01)

(58) Field of Classification Search
CPC .................................................... B60C 1/0008
See application file for complete search history.

(56) References Cited

U.S. PATENT DOCUMENTS

| 2,586,363 | A  | * | 2/1952 | McAlevy .................. C08F 8/38 525/331.6 |
| 4,885,341 | A  | * | 12/1989 | Aonuma .................. C08L 23/22 525/187 |
| 7,649,043 | B2 | * | 1/2010 | Bergman ................. C08L 21/00 152/510 |
| 8,153,719 | B2 | * | 4/2012 | Tse ........................ B60C 1/0008 524/445 |
| 2007/0161735 | A1 | | 7/2007 | Bergman |
| 2008/0314492 | A1 | | 12/2008 | Tsou et al. |
| 2009/0005493 | A1 | | 1/2009 | Tse |
| 2009/0218024 | A1 | | 9/2009 | Tsou et al. |
| 2009/0242094 | A1 | | 10/2009 | Kato et al. |
| 2009/0308517 | A1 | * | 12/2009 | Nohara .............. B29D 30/0681 152/450 |
| 2011/0240196 | A1 | | 10/2011 | Tse |

OTHER PUBLICATIONS

International Search Report and Written Opinion, dated Apr. 26, 2012.

* cited by examiner

*Primary Examiner* — Robert C Dye
(74) *Attorney, Agent, or Firm* — Frank J. Campigotto

(57) ABSTRACT

A barrier layer is provided for an inflatable article for impeding the flow of inflation gas through the inflatable article. The barrier layer may be constructed of a material that is based upon a cross-linkable rubber composition, the cross-linkable rubber composition comprising, per 100 parts by weight of rubber (phr), between 1 phr and 40 phr of a chlorosulfonated polyethylene rubber, between 60 phr and 99 phr of a butyl rubber and a sulfur curing system.

13 Claims, No Drawings

INNER LINER FOR PNEUMATIC TIRE

BACKGROUND OF THE INVENTION

Field of the Invention

This invention relates generally barrier layers and more specifically to barrier layers in pneumatic tires that decrease the diffusion of gas through the tire.

Description of the Related Art

Various articles are constructed to hold gas, such as air, under pressure, examples of which include tires, athletic balls such as basketballs, footballs and tennis balls, inflatable boats, air mattresses, and the like. These articles are typically made from a polymeric material having some elastic properties. Tires, for instance, are typically made from rubber materials such as styrene butadiene rubber, polybutadiene rubber and/or natural rubber.

Many elastomeric materials used to make inflatable articles may, in some circumstances, remain slightly permeable to gases. If left unchecked, the gas permeability of the inflated article may compromise the performance of the article and cause the article to deflate over time. Furthermore, if the gas that passes through the slightly permeable material is oxygen, then the oxygen can cause oxidation of the elastomers, causing deleterious effects to the properties of the elastomer, e.g., the elastomers may tend to harden and degrade.

In view of the above, it is often advantageous for inflatable articles to contain a barrier layer that reduces gas permeability and inhibits oxygen travel through the article. Often, in the past, these barrier layers have been made from a composition containing butyl rubber, a copolymer that contains a majority of isobutylene units. Butyl rubber in its raw state, however, still remains somewhat gas permeable. Thus, efforts continue in the industry to discover new ways of providing an effective barrier to the diffusion of gas through rubber articles.

SUMMARY OF THE INVENTION

Embodiments include a barrier layer for an inflatable article and inflatable articles having a barrier layer. In an embodiment, a barrier layer is provided for impeding the flow of inflation gas through an inflatable article, the barrier layer constructed of a material that is based upon a cross-linkable rubber composition, the cross-linkable rubber composition comprising, per 100 parts by weight of rubber (phr), between 1 phr and 40 phr of a chlorosulfonated polyethylene rubber, between 60 phr and 99 phr of a butyl rubber and a sulfur curing system.

The chlorosulfonated polyethylene rubber may, in particular embodiments, have a chlorine content of between 30 wt. % and 40 wt. % and/or a sulfur content of between 1 wt. % and 1.3 wt. % sulfur.

The foregoing and other objects, features and advantages of the invention will be apparent from the following more detailed descriptions of particular embodiments of the invention.

DETAILED DESCRIPTION OF PARTICULAR EMBODIMENTS

Reference will now be made in detail to embodiments of the invention. Each example is provided by way of explanation of the invention. For example, features illustrated or described as part of one embodiment can be used with another embodiment to yield still a third embodiment. It is intended that the present invention include these and other modifications and variations.

Embodiments of the present invention include barrier layers such as innerliners and/or inner tubes for tires and other inflatable articles. Other embodiments include the inflatable articles themselves, the rubber compositions making the barrier layers and their methods of manufacture. In particular embodiments, the barrier layers are manufactured from a rubber composition that includes a mixture of a butyl rubber and a chlorosulfonated polyethylene synthetic rubber.

Surprisingly it has been determined that the addition of no more than 40 phr of the chlorosulfonated polyethylene (CSM) synthetic rubber does not result in a degradation of the oxygen permeability properties of the material so the material remains suitable for the manufacture of barrier layers. Indeed in some cases the gas impermeability of the material actually improves. Gas impermeability is a desired characteristic because an inflatable article having a low permeability barrier layer can better retain its inflation gases over a period of time.

As used herein, "phr" is 'parts per hundred rubber' and is a measure common in the art wherein components of a composition are measured relative to a major elastomer component, based upon 100 parts by weight of the elastomer(s) or rubber(s).

As used herein, "based upon" is a term that recognizes embodiments of the present invention are made of vulcanized or cured rubber compositions that were, at the time of their assembly, uncured. The cured rubber composition is therefore "based upon" the uncured rubber composition. In other words, the cross-linked rubber composition is based upon the cross-linkable rubber composition.

As used herein, "elastomer" or elastomeric compositions" refers to any polymer or composition of polymers (such as blends of polymers) that exhibit the properties of rubber and therefore the terms "elastomer" and "rubber" may be used interchangeably herein.

The rubber compositions disclosed herein that are useful as barrier layers include a butyl rubber and a chlorosulfonated polyethylene rubber. Butyl rubber is often used for inner liners and inner tubes in pneumatic tires because of its low permeability characteristic, i.e., it can significantly reduce the amount of inflation gases that pass through the barrier layer over a period of time. It is not, however, well characterized as having low hysteresis, a property that would result in providing low rolling resistance in a tire. Butyl rubber is a copolymer of isobutylene with small amounts of isoprene. Typically butyl rubber comprises more than 90 mole percent of isobutylene derived units and less than 10 mole percent of isoprene derived units.

Butyl rubber is also useful in its halogenated form. Halogenated butyl rubber may include, for example, a chlorobutyl rubber or a bromobutyl rubber. Halogenated butyl rubbers are well known in the industry and are produced by reacting chlorine or bromine with a butyl rubber in a continuous process. Bromobutyl and chlorobutyl rubbers are available, for example, from Lanxess with offices in Fairlawn, Ohio.

The other elastomer included in the barrier layer compositions disclosed herein are chlorosulfonated polyethylene rubbers (CSM). CSM is an elastomeric material manufactured by the simultaneous functionalization and modification of polyethylene by actions of chorine and sulfur dioxide on the polyethylene while it is dissolved in carbon tetrachloride. Commercial CSM products useful for embodiments of the present invention typically have chlorine contents ranging between 25 wt. % and 45 wt. % and between 1 wt. % and 2.2 wt. % sulfur. Such commercial products are widely available, one source being Lianda, having offices in Hudson, Ohio that sales such CSM products including HAILON CSM 3570 and HAILON CSM 3695.

The amount of sulfur and the amount of chlorine that is added to the polyethylene effects the physical characterization of the product material. Particular embodiments of the present invention may further include a CSM having a chlorine content of between 30 wt. % and 40 wt. % or alternatively between 32 wt. % and 37 wt. % and further may include those having a sulfur content of between 1 wt. % and 1.3 wt. %.

Particular embodiments of the rubber compositions disclosed herein may also include one or more filler components such as calcium carbonate, clay, mica, silica and silicates, talc, titanium dioxide, and carbon black. Such fillers may include permeability reducing mineral fillers that are capable of reducing the gas permeability characteristics of a barrier layer formed from the composition and are, thanks to their form, size or shape factor, generally known as "platy fillers" (i.e., under the form of plates, platelets, layers, stacked layers or platelets, etc).

Examples of platy fillers include silicates, such as phyllosilicates, smectite and vermiculite clay minerals and various other clay materials. Particular examples include kaolin, montmorillonite such as sodium montmorillonite, magnesium montmorillonite, and calcium montmorillonite, nontronite, beidellite, volkonskoite, hectorite, laponite, sauconite, sobockite, stevensite, svinfordite, vermiculite, mica, bentonite, sepeolite, saponite, and the like. Other materials that may be used include micaceous minerals such as illite and mixed layered illite/smectite minerals, such as ledikite and admixtures of illites and the clay minerals described above. Many of these and other layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered platy fillers, such as clay, can be exfoliated by suspending the platy filler in a water solution. As used herein, "exfoliation" refers to the separation of individual layers of the original inorganic particle, so that polymer can surround or surrounds each particle. In an embodiment, sufficient polymer is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy and atomic force microscopy.

Preferably, when exfoliating the layered clays, the concentration of clay in water is sufficiently low to minimize the interaction between clay particles and to fully exfoliate the clay. In one embodiment, the aqueous slurry of clay can have a clay concentration of between 0.1 and 5.0 weight percent or alternatively, between 0.1 and 3.0 weight percent. Organoclays can be obtained by using an organic exfoliating agent such as, for example, tertiary amines, diamines, polyamines, amine salts, as well as quaternary ammonium compounds. Exemplary organoclays are available commercially from Southern Clay Products under the trade names CLOISITE 6A, 15A, and 20A, which are natural montmorillonite clays modified with quaternary ammonium salts. CLOISITE 6A, for example, contains 140 meq/100 g clay of dimethyl dihydrogenated tallow quaternary ammonium salts.

In addition to dimethyl-dihydrogenated tallow-quaternary ammonium salts, clays may also be organically modified, for example, with an octadecylamine or a methyl-tallow-bis-2-hydroxyethyl quaternary ammonium salt. Still other examples of useful surfactants that may be used to modify the particles include dimethyl ditallow ammonium, dipolyoxyethylene alkyl methyl ammonium, trioctyl methyl ammonium, polyoxypropylene methyl diethyl ammonium, dimethyl benzyl hydrogenated tallow quaternary ammonium, dimethyl hydrogenated tallow 2-ethylhexyl quaternary ammonium, methyl dihydrogenated tallow ammonium, and the like.

Particular embodiments of the rubber composition disclosed herein include platy fillers such as clay or exfoliated clay that have been organically modified, those that have not been organically modified and combinations thereof. The amount of platy filler incorporated into the rubber composition in accordance with this invention depends generally on the particular particles selected and the materials with which they are mixed. Generally an amount is added that is sufficient to develop an improvement in the mechanical properties or barrier properties of the rubber composition, e.g., tensile strength or oxygen permeability.

For example, the platy fillers may be present in the composition in an amount of between 1 phr and 30 phr, between 1 phr and 25 phr or between 1 phr and 15 phr. In other embodiments, the fillers may be present in amount of between 3 phr and 10 phr, between 2 phr and 8 phr, or between 3 phr and 7 phr. Such total amounts of platy filler may include just the organically modified filler (such as an organoclay), just the non-organically modified filler or mixtures thereof.

In addition to the platy fillers, carbon black and/or silica may also be incorporated into particular embodiments of the rubber composition disclosed herein in quantities sufficient to provide the desired physical properties of the material, e.g., modulus and cohesion. In an embodiment, the silica is a highly dispersible precipitated silica but other silicas may also be used in other embodiments. Such amounts may include, for example, between 10 phr and 150 phr of carbon black and/or silica or alternatively, between 5 phr and 100 phr or between 30 phr and 70 phr of carbon black and/or silica.

Non-limiting examples of useful carbon blacks may include N550, N650, N660, N762, N772 and N990. Non-limiting examples of useful silica include Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

Optionally, an embodiment of the rubber composition disclosed herein may include a plasticizing terpene resin having a relatively high glass transition temperature. A terpene resin may be included for exemplary benefits that may include improving the dispensability of the permeability reducing particles, improving the processability of the composition by lowering the modulus and the viscosity of the composition and further reducing the gas permeability of the material.

Generally, as a plasticizing resin, the terpene resin is solid at ambient temperature, e.g., about 25° C., and is miscible in the rubber composition at the level used, typically over 5 phr so that it acts as a true diluting agent. Thus, a plasticizing resin should not be confused with a "tackifying" resin, which is generally used at a lower level, e.g., typically less than 5 phr, and is typically immiscible and thus intended to migrate to the surface to give tack to the rubber composition. A useful terpene resin may be unmodified and includes, for example, polylimonene, poly alpha-pinene, poly beta-pinene, or mixtures thereof.

The terpene resin may have a relatively low molecular weight, such as less than about 2000. As described above, terpene hydrocarbon resins for use in particular embodiments of the present invention generally have a relatively high glass transition temperature. For instance, the glass transition temperature of the terpene hydrocarbon resin is greater than about 50° C., and may be greater than about 60° C., or even greater than about 70° C.

The terpene resin should further have a softening point that is compatible with the processing of the other materials contained in the composition. For example, when forming a barrier layer, the terpene resin is mixed, heated, and melted with the other components in the composition. Thus, the terpene resin should have a softening point that is less than the temperature at which other ingredients in the composition, such as the elastomer, begin to degrade and break down. When the elastomer combined with the terpene resin is a butyl rubber, for instance, it is advantageous for the terpene resin to have a softening point of less than about 170° C., such as less than about 140° C. In other applications, however, the softening point of the terpene resin may be higher than the above temperatures. As used herein, the softening point is determined by the "Ring and Ball" method such as described in ASTM E-28.

Commercially available terpene resins that may be used in the present invention include a poly alpha-pinene resin marketed under the name Resin R2495 by Hercules Inc. of Wilmington, Del. Resin R2495 has a molecular weight of about 932, a softening point of about 135° C. and a glass transition temperature of about 91° C. Another commercially available product that may be used in the present invention includes DERCOLYTE L120 polylimonene resin sold by the company DRT of France. DERCOLYTE L120 polylimonene resin has a molecular weight of about 877, has a softening point of about 119° C., and has a glass transition temperature of about 73° C. Still another commercially available terpene resin that may be used in the present invention includes SYLVARES 7125 polylimonene resin sold by the Arizona Chemical Company of Jacksonville, Fla. SYLVARES 7125 polylimonene resin has a molecular weight of about 102, has a softening point of about 125° C., and has a glass transition temperature of about 73° C.

The amount of terpene resin present in the composition depends upon the particular circumstances and the desired result. In general, for instance, the terpene resin may be present in the composition in an amount from about 1 to about 50 phr, such as from about 1 to about 35 phr. For instance, in one embodiment, the resin may be present in the composition in an amount from about 5 phr to about 20 phr.

The rubber compositions disclosed herein can be cured with a sulfur curing system that typically includes sulfur and an accelerator. Suitable free sulfur includes, for example, pulverized sulfur, rubber maker's sulfur, commercial sulfur, and insoluble sulfur. The amount of free sulfur included in the rubber composition may range between 0.5 and 3 phr or alternatively between 0.8 and 2.5 phr or between 1 and 2 phr.

Use may be made of any compound capable of acting as curing accelerator in the presence of sulfur, in particular those chosen from the group consisting of 2-2'-dithio bis (benzothiazole) (MBTS), diphenyl guanidine (DPG), N-cyclohexyl-2-benzothiazole-sulphenamide (CBS), N,N-dicyclohexyl-2-benzothiazolesulphenamide (DCBS), N-tert-butyl-2-benzo-thiazole-sulphenamide (TBBS), N-tert-butyl-2-benzothiazolesulphen-imide (TBSI) and the mixtures of these compounds.

Other additives can be added to the rubber composition disclosed herein as known in the art. Such additives may include, for example, some or all of the following: antidegradants, antioxidants, fatty acids, pigments, waxes, stearic acid, zinc oxide and other accelerators. Examples of antidegradants and antioxidants include 6PPD, 77PD, IPPD and TMQ and may be added to rubber compositions in an amount of from 0.5 phr and 5 phr. Zinc oxide may be added in an amount of between 1 phr and 6 phr, 1 phr and 4 phr or between 1 phr and 3 phr. Tackifying resins (such as octyl-phenol formaldehyde resin) can also be included in the rubber composition.

Barrier layers made according to the present invention may be incorporated into numerous articles. An embodiment includes an article having the barrier layer constructed of the rubber composition disclosed herein. For example, in one embodiment, barrier layers made according to the present invention may be incorporated into elastomeric articles that are intended to be inflated with a gas. In these applications, the barrier layer inhibits gas flow through the wall of the article. Particular examples of articles that may incorporate a barrier layer according to the present invention include sports balls such as footballs, basketballs, and the like, flotation devices such as inflatable boats, air mattresses, and the like. Tires also have a need for barrier layers to protect the tires from deflating quickly over time or from damage to the tire internals from oxidation caused by oxygen migrating through the tire from the interior of the tire.

While the barrier layer is typically on the interior wall of the inflated chamber of the article or alternatively made of an inner tube, the barrier layer may also be placed further within the wall of the article. For example, while a tire typically includes a barrier layer disposed on the inner wall of the tire, a barrier layer may also be included within the wall of the tire carcass. Barrier layers for tires as disclosed herein can be used for all types of tires including truck tires, aircraft tires, passenger tires and light truck tires.

The rubber compositions of particular embodiments may be processed in a suitable mixing device such as a BANBURY mixer under conditions of shear sufficient to allow the components to become uniformly dispersed. In a two-step process, the elastomers are first masticated to increase their temperature and then all the other components, other than the cure package, are added. The rubber composition is continued to be mixed until a temperature of between about 140° C. and about 180° C. is reached. The mix is then dropped and cooled.

In a second step, the mix is processed on a mill to mix the cure package into the rubber composition.

The resulting rubber composition may be extruded, compression molded, blow molded or injection molded into various shaped articles including innerliners and inner tubes for inflatable articles.

The invention is further illustrated by the following examples, which are to be regarded only as illustrations and not delimitative of the invention in any way. The properties of the compositions disclosed in the examples were evaluated as described below.

Moduli of elongation (MPa) were measured at 10% (MA10), 100% (MA 100) and at 300% (MA300) at a temperature of 23° C. based on ASTM Standard D412 on dumb bell test pieces. The measurement were taken in the second elongation; i.e., after an accommodation cycle.

These measurements are secant moduli in MPa, based on the original cross section of the test piece.

Hysteresis losses (HL) were measured in percent by rebound at 60° C. at the sixth impact in accordance with the following equation:

$$HL(\%) = 100(W_0 - W_1)/W_1,$$

where $W_0$ is the energy supplied and $W_1$ is the energy restored.

The elongation property was measured as elongation at break (%) and the corresponding elongation stress (MPa), which was measured at 23° C. in accordance with ASTM Standard D412 on ASTM C test pieces.

Oxygen permeability (mm cc)/(m$^2$ day) was measured using a MOCON OX-TRAN 2/60 permeability tester at 40° C. in accordance with ASTM D3985. Cured sample disks of measured thickness (approximately 0.8-1.0 mm) were mounted on the instrument and sealed with vacuum grease. Nitrogen (with 2% H$_2$) flow was established at 10 cc/min on one side of the disk and oxygen (10% O$_2$, remaining N$_2$) flow was established at 20 cc/min on the other side. Using a Coulox oxygen detector on the nitrogen side, the increase in oxygen concentration was monitored. The time required for oxygen to permeate through the disk and for the oxygen concentration on the nitrogen side to reach a constant value, was recorded along with the barometric pressure and used to determine the oxygen permeability, which is the product of the oxygen permeance and the thickness of the sample disk in accordance with ASTM D3985.

Mooney Plasticity ML (1+4): Mooney Plasticity was measured in accordance with ASTM Standard D1646-04. In general, the composition in an uncured state is molded in a cylindrical enclosure and heated to 100° C. After 1 minute of preheating, the rotor turns within the test sample at 2 rpm, and the torque used for maintaining this movement is measured after 4 minutes of rotation. The Mooney Plasticity is expressed in "Mooney units" (MU, with 1 MU=0.83 Newton-meter).

Example 1

Using the two-step process described above, elastomer formulations W1-W3 and F1-F8 were prepared using the components shown in Table 1. The amount of each component making up the elastomer formulations F1-F8 are provided in Table 1 in parts per hundred parts by weight (phr) of the elastomer. After mixing, the formulations were formed into sheets and testing plaques were cut from each of the formulations and cured at 150° C. for 60 minutes.

The witness formulations, W1-W3, included only the butyl rubber or the chlorosulfonated polyethylene alone as the elastomer in the formulations. The butyl rubber was a brominated butyl rubber and two different chlorosulfonated polyethylene rubbers were used: HAILON CSM 3570 having a chlorine content of 35 wt. %, a sulfur content of 1.2 wt. % and a Mooney viscosity ML(1+4) of 70 at 100° C. and HAILON CSM 3695 having a chlorine content of 35 wt. %, a sulfur content of 1.0 wt. % and a Mooney viscosity ML(1+4) of 95 at 100° C.

TABLE 1

Rubber Formulations with Physical Properties

|  | W1 | W2 | W3 | F1 | F2 | F3 | F4 | F5 | F6 | F7 | F8 |
|---|---|---|---|---|---|---|---|---|---|---|---|
| Elastomer Composition | | | | | | | | | | | |
| BIIR | 100 | | | 90 | 80 | 70 | 60 | 90 | 80 | 70 | 60 |
| CSM 3570 | | 100 | | 10 | 20 | 30 | 40 | | | | |
| CSM 3695 | | | 100 | | | | | 10 | 20 | 30 | 40 |
| Carbon Black | 50 | 50 | 50 | 50 | 50 | 50 | 50 | 50 | 50 | 50 | 50 |
| Resin | 2.5 | 2.5 | 2.5 | 2.5 | 2.5 | 2.5 | 2.5 | 2.5 | 2.5 | 2.5 | 2.5 |
| Cure Package | 5.7 | 5.7 | 5.7 | 5.7 | 5.7 | 5.7 | 5.7 | 5.7 | 5.7 | 5.7 | 5.7 |
| Physical Properties | | | | | | | | | | | |
| Mooney ML (1 + 4) | 58 | 119 | 135 | 56.8 | 56.1 | 58.2 | 58.6 | 57.5 | 58.7 | 60.0 | 62.0 |
| MA10, MPa | 3.3 | 12.5 | 13.9 | 5.4 | 5.8 | 5.1 | 4.6 | 6.0 | 5.9 | 5.0 | 4.4 |
| MA100, MPa | 1.10 | 8.22 | 8.68 | 1.07 | 1.39 | 1.74 | 1.96 | 1.11 | 1.40 | 1.71 | 1.89 |
| Hysteresis Loss (%) | 32.0 | 29.8 | 28.0 | 49.7 | 52.3 | 47.1 | 43.6 | 50.8 | 51.3 | 46.6 | 41.0 |
| Elongation Stress, MPa | 14.6 | 14.2 | 20.8 | 8.1 | 6.1 | 5.5 | 5.5 | 8.2 | 6.7 | 6.3 | 5.5 |
| Elongation at Break, % | 637 | 125 | 170 | 634 | 493 | 368 | 338 | 577 | 497 | 390 | 270 |
| Oxygen Permeability, (mm cc)/(m$^2$ day) | 147 | 100 | 119 | 149 | 147 | 143 | 150 | 139 | 141 | 137 | 148 |
| O$_2$ Perm, % Improved | base | 32 | 19 | −1.3 | 0 | 2.7 | −2.0 | 5.4 | 4.1 | 6.8 | −0.5 |

Formulations F1 through F4 were mixed with the bromobutyl rubber and different levels of the HAILON CSM 3570 while F5 through F8 were mixed the same except with the HAILON CSM 3695 replacing the CSM 3570. The carbon black used in the formulations was N772, the resin was a tackifier resin and the cure package included sulfur, accelerator, stearic acid and zinc oxide.

The cured plaques were tested as described above to measure their physical properties. The oxygen permeability of the cured samples remarkably maintained their barrier properties as demonstrated by the percent improvement of the O$_2$ permeability results.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A pneumatic tire having an inner tube or inner liner consisting only of a rubber composition based upon a cross-linkable elastomer composition, the cross-linkable elastomer composition comprising per 100 parts by weight or rubber (phr):
   a rubber mixture of between 10 phr and 40 phr of a non-cross-linked chlorosulfonated polyethylene rubber and between 60 phr and 99 phr of a non-cross-linked butyl rubber; and
   a single sulfur curing system for curing both the non-cross-linked chlorosulfonated polyethylene rubber and the non-cross-linked butyl rubber in the rubber mixture.

2. The pneumatic tire of claim 1, wherein the chlorosulfonated polyethylene rubber has a chlorine content of between 30 wt. % and 40 wt. %.

3. The pneumatic tire of claim 1, wherein the chlorosulfonated polyethylene rubber has a sulfur content of between 1 wt. % and 1.3 wt. %.

4. The pneumatic tire of claim 1, wherein the cross-linkable elastomer composition further comprises:
   a platy filler.

5. The pneumatic tire of claim 4, wherein the platy filler is an organo-modified platy filler.

6. The pneumatic tire of claim 5, wherein the platy filler is an organoclay.

7. The pneumatic tire of claim 5, wherein the cross-linkable elastomer composition comprises between 1 phr and 15 phr of the platy filler.

8. The pneumatic tire of claim 1, wherein the cross-linkable elastomer composition further comprises:
   a plasticizing terpene resin.

9. The pneumatic tire of claim 1, wherein the butyl rubber is halogenated.

10. The pneumatic tire of claim 9, wherein the butyl rubber is bromobutyl rubber.

11. The pneumatic tire of claim 1, wherein the barrier layer is an inner tube adapted for a pneumatic tire.

12. The pneumatic tire of claim 1, wherein the barrier layer is disposed on an interior surface of the pneumatic tire.

13. The pneumatic tire of claim 1, further comprising between 30 phr and 70 phr of a filler selected from carbon black, silica and combinations thereof.

* * * * *